US012688125B1

(12) United States Patent
Pang et al.

(10) Patent No.: US 12,688,125 B1
(45) Date of Patent: Jul. 21, 2026

(54) METHOD AND APPARATUS FOR WRITE DESTAGE

(71) Applicant: Dell Products L.P., Round Rock, TX (US)

(72) Inventors: Lixin Pang, Needham, MA (US); Rong Yu, West Roxbury, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/034,747

(22) Filed: Jan. 23, 2025

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC .......................... G06F 12/0802; G06F 2212/60
See application file for complete search history.

(56) References Cited

U.S. PATENT DOCUMENTS

| | | | | |
|---|---|---|---|---|
| 5,933,840 A * | 8/1999 | Menon | .................. | G06F 3/0652 |
| 2004/0062106 A1 * | 4/2004 | Ramesh | ............ | G06F 16/24552 |
| | | | | 365/202 |
| 2009/0204753 A1 * | 8/2009 | Bridge, Jr. | ............ | G06F 12/123 |
| | | | | 711/E12.001 |
| 2013/0083802 A1 * | 4/2013 | Chen | ....................... | H04L 45/28 |
| | | | | 370/400 |

OTHER PUBLICATIONS

U.S. Appl. No. 19/034,814, filed Jan. 23, 2025, Pang, et al.

* cited by examiner

*Primary Examiner* — Kevin Verbrugge
(74) *Attorney, Agent, or Firm* — Daly, Crowley, Mofford & Durkee, LLP.

(57) ABSTRACT

A method for use in a storage system, including: selecting one or more front-end (FE) tracks that are arranged to cache data associated with one or more write requests; selecting a given one of a plurality of buckets in an aging queue as a recipient for the FE tracks, the given bucket being selected based on one or more characteristics of the FE tracks; placing the FE tracks in the given bucket; updating an aging time for the given bucket; waiting until an age of the FE tracks is greater than the aging time of the aging queue, and placing the one or more FE tracks in a write commit queue after the age of the FE tracks has become greater than the aging time of the aging queue; and completing the write requests after one or more FE tracks have been placed in the write commit queue.

20 Claims, 9 Drawing Sheets

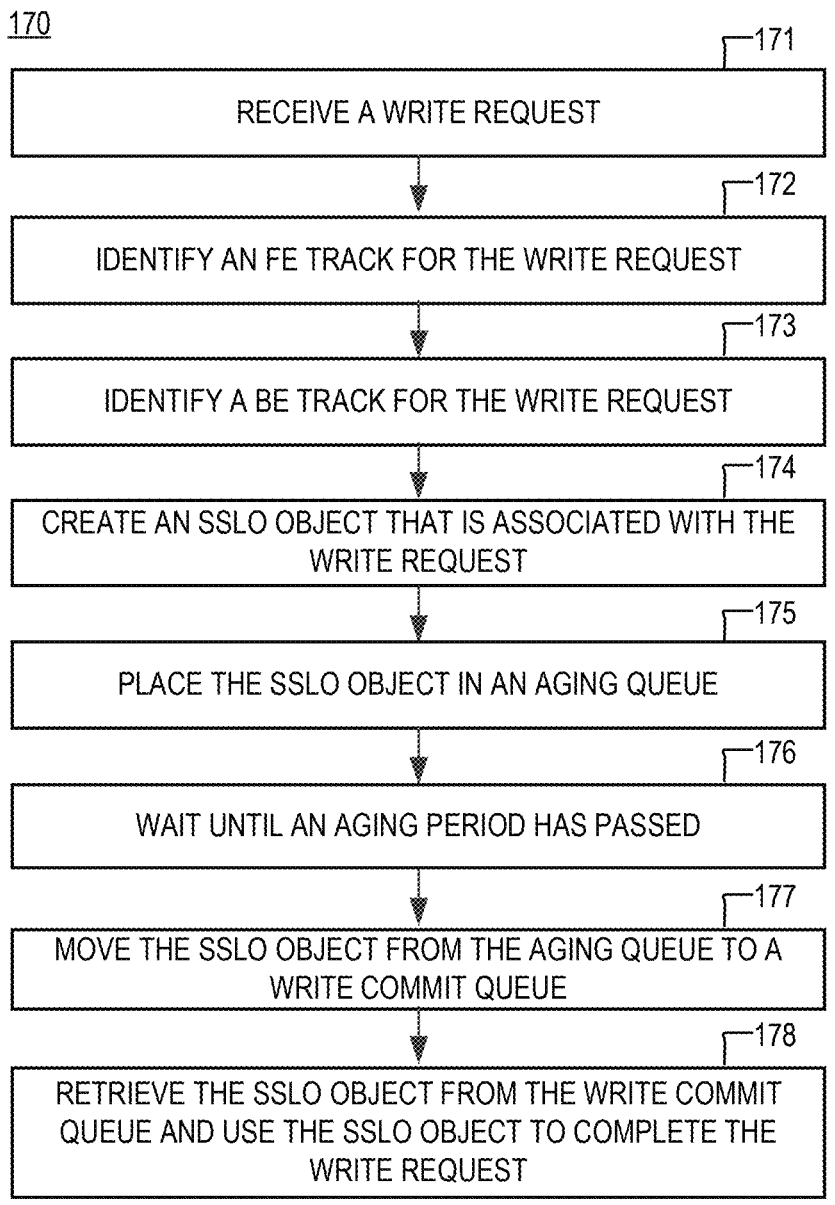

170

171
RECEIVE A WRITE REQUEST

172
IDENTIFY AN FE TRACK FOR THE WRITE REQUEST

173
IDENTIFY A BE TRACK FOR THE WRITE REQUEST

174
CREATE AN SSLO OBJECT THAT IS ASSOCIATED WITH THE WRITE REQUEST

175
PLACE THE SSLO OBJECT IN AN AGING QUEUE

176
WAIT UNTIL AN AGING PERIOD HAS PASSED

177
MOVE THE SSLO OBJECT FROM THE AGING QUEUE TO A WRITE COMMIT QUEUE

178
RETRIEVE THE SSLO OBJECT FROM THE WRITE COMMIT QUEUE AND USE THE SSLO OBJECT TO COMPLETE THE WRITE REQUEST

FIG. 1F

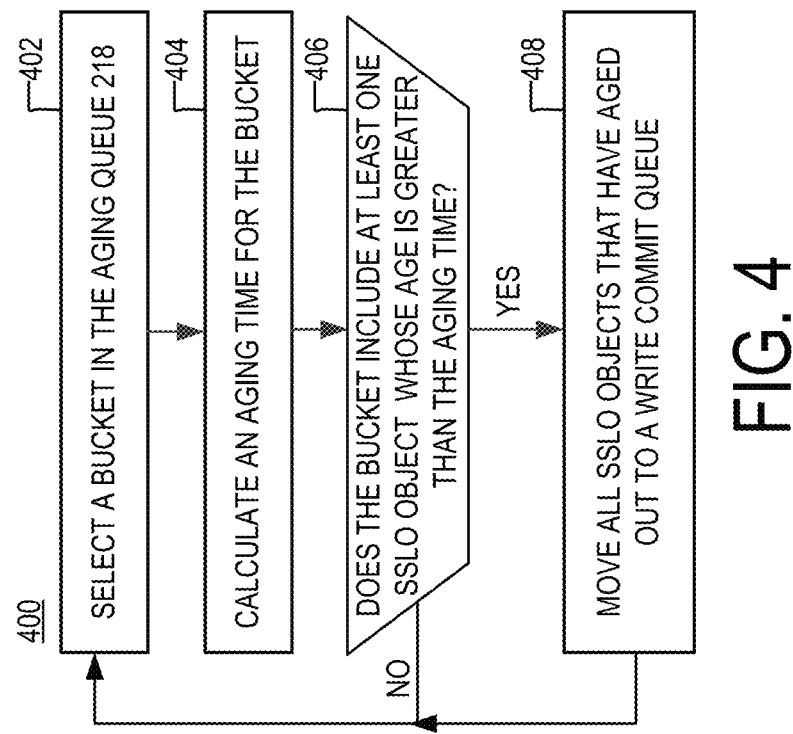

400

SELECT A BUCKET IN THE AGING QUEUE 218 ⌐402

CALCULATE AN AGING TIME FOR THE BUCKET ⌐404

DOES THE BUCKET INCLUDE AT LEAST ONE SSLO OBJECT WHOSE AGE IS GREATER THAN THE AGING TIME? ⌐406

NO

YES

MOVE ALL SSLO OBJECTS THAT HAVE AGED OUT TO A WRITE COMMIT QUEUE ⌐408

FIG. 4

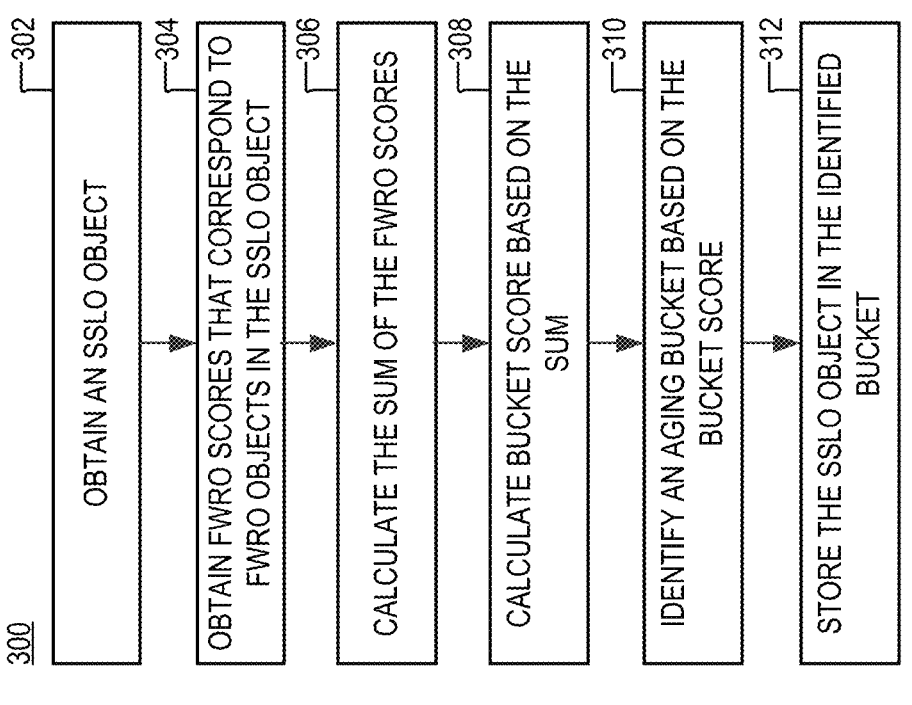

300

OBTAIN AN SSLO OBJECT ⌐302

OBTAIN FWRO SCORES THAT CORRESPOND TO FWRO OBJECTS IN THE SSLO OBJECT ⌐304

CALCULATE THE SUM OF THE FWRO SCORES ⌐306

CALCULATE BUCKET SCORE BASED ON THE SUM ⌐308

IDENTIFY AN AGING BUCKET BASED ON THE BUCKET SCORE ⌐310

STORE THE SSLO OBJECT IN THE IDENTIFIED BUCKET ⌐312

FIG. 3

METHOD AND APPARATUS FOR WRITE DESTAGE

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method for use in a storage system is provided, comprising: selecting one or more front-end (FE) tracks that are arranged to cache data associated with one or more write requests; selecting a given one of a plurality of buckets in an aging queue as a recipient for the FE tracks, the given bucket being selected based on one or more characteristics of the FE tracks; placing the FE tracks in the given bucket; updating an aging time for the given bucket; waiting until an age of the FE tracks is greater than the aging time of the aging queue, and placing the one or more FE tracks in a write commit queue after the age of the FE tracks has become greater than the aging time of the aging queue; and completing the write requests after one or more FE tracks have been placed in the write commit queue.

According to aspects of the disclosure, a system is provided, comprising: a memory; and at least one processor that is operatively coupled to the memory, the at least one processor being configured to perform the operations of: selecting one or more front-end (FE) tracks that are arranged to cache data associated with one or more write requests; selecting a given one of a plurality of buckets in an aging queue as a recipient for the FE tracks, the given bucket being selected based on one or more characteristics of the FE tracks; placing the FE tracks in the given bucket; updating an aging time for the given bucket; waiting until an age of the FE tracks is greater than the aging time of the aging queue, and placing the one or more FE tracks in a write commit queue after the age of the FE tracks has become greater than the aging time of the aging queue; and completing the write requests after one or more FE tracks have been placed in the write commit queue.

According to aspects of the disclosure, a non-transitory computer readable medium storing one or more processor-executable instructions, which, when executed by at least one processor, cause the at least one processor to perform the operations of: selecting one or more front-end (FE) tracks that are arranged to cache data associated with one or more write requests; selecting a given one of a plurality of buckets in an aging queue as a recipient for the FE tracks, the given bucket being selected based on one or more characteristics of the FE tracks; placing the FE tracks in the given bucket; updating an aging time for the given bucket; waiting until an age of the FE tracks is greater than the aging time of the aging queue, and placing the one or more FE tracks in a write commit queue after the age of the FE tracks has become greater than the aging time of the aging queue; and completing the write requests after one or more FE tracks have been placed in the write commit queue.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 1F is a flowchart of an example of a process, according to aspects of the disclosure;

FIG. 3 is a flowchart of an example of a process, according to aspects of the disclosure;

FIG. 4 is a flowchart of an example of a process, according to aspects of the disclosure.

DETAILED DESCRIPTION

Figure 1A:
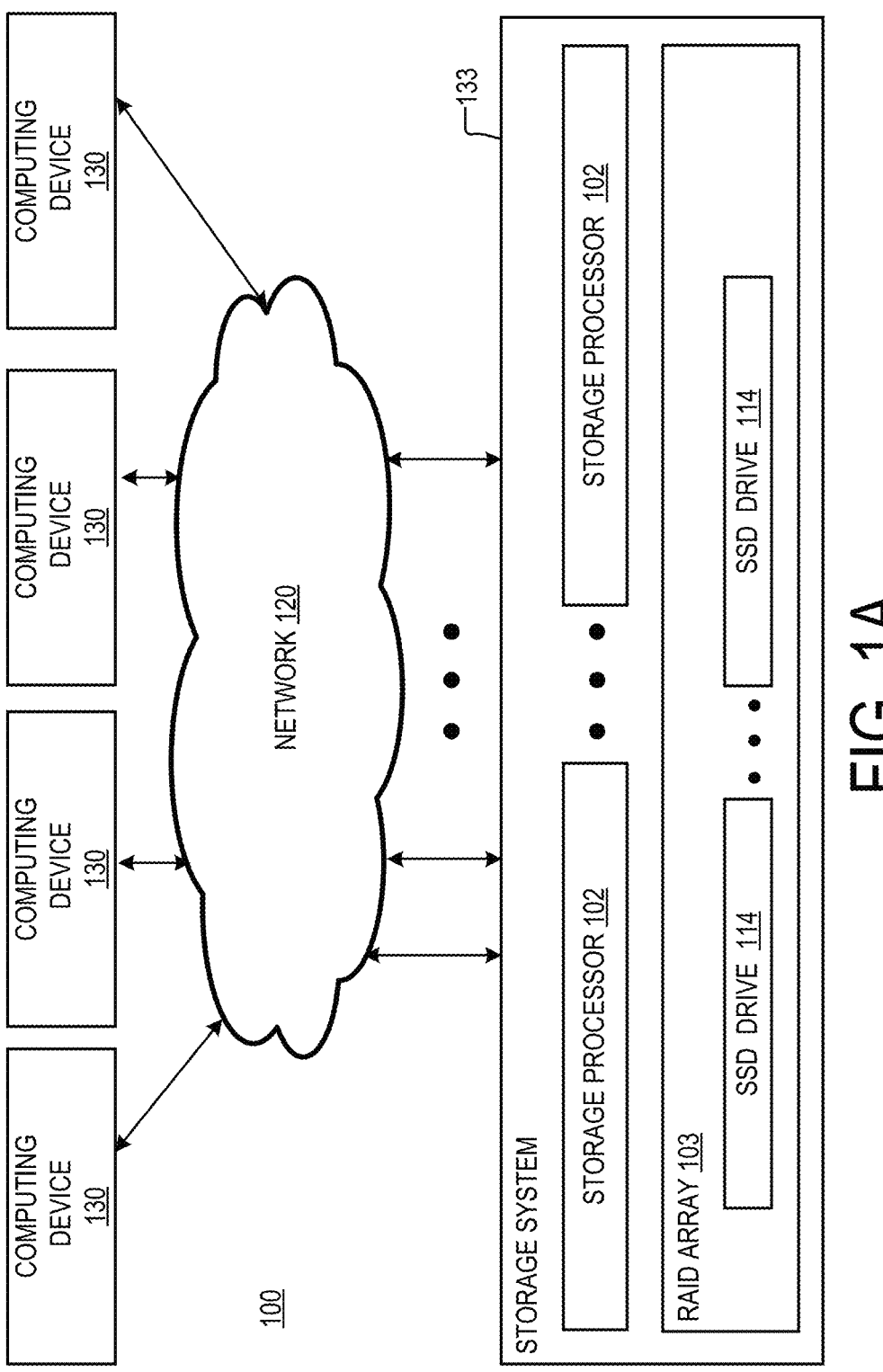
FIG. 1A is a diagram of an example of a system, according to aspects of the disclosure.

FIG. 1A is a diagram of an example of a system 100, according to aspects of the disclosure. As illustrated, system 100 may include a storage system 133 that is coupled to a plurality of computing devices 130 via a communications network 120. Each of the computing devices 130 may include a smartphone, a desktop, a server, a laptop, and/or any other device that might be used by a user to store and retrieve data from the storage system 133. Each of the computing devices may be the same or similar to the computing device 500, which is discussed further below with respect to FIG. 5. The communications network 120 may include one or more of the Internet, a local area network (LAN), a wide area network (WAN), an InfiniBand network, a mobile data network, etc. Storage system 133 may include a plurality of storage processors 102 and a plurality of storage devices 114. In some implementations, each of the storage devices 114 may include a Solid-State Drive (SSD), a Non-Volatile Memory Express (NVME) device, a hard disk, and/or any other suitable type of storage device. According to the present example, the storage devices are arranged in a RAID array 103. Each of the storage processors 102 may include a computing device, such as the computing device 500, which is discussed further below with respect to FIG. 5. Each of the storage processors 102 may be configured to receive I/O requests from the computing devices 130 and execute the received requests by reading or writing data to the RAID array 103.

Figure 1B:
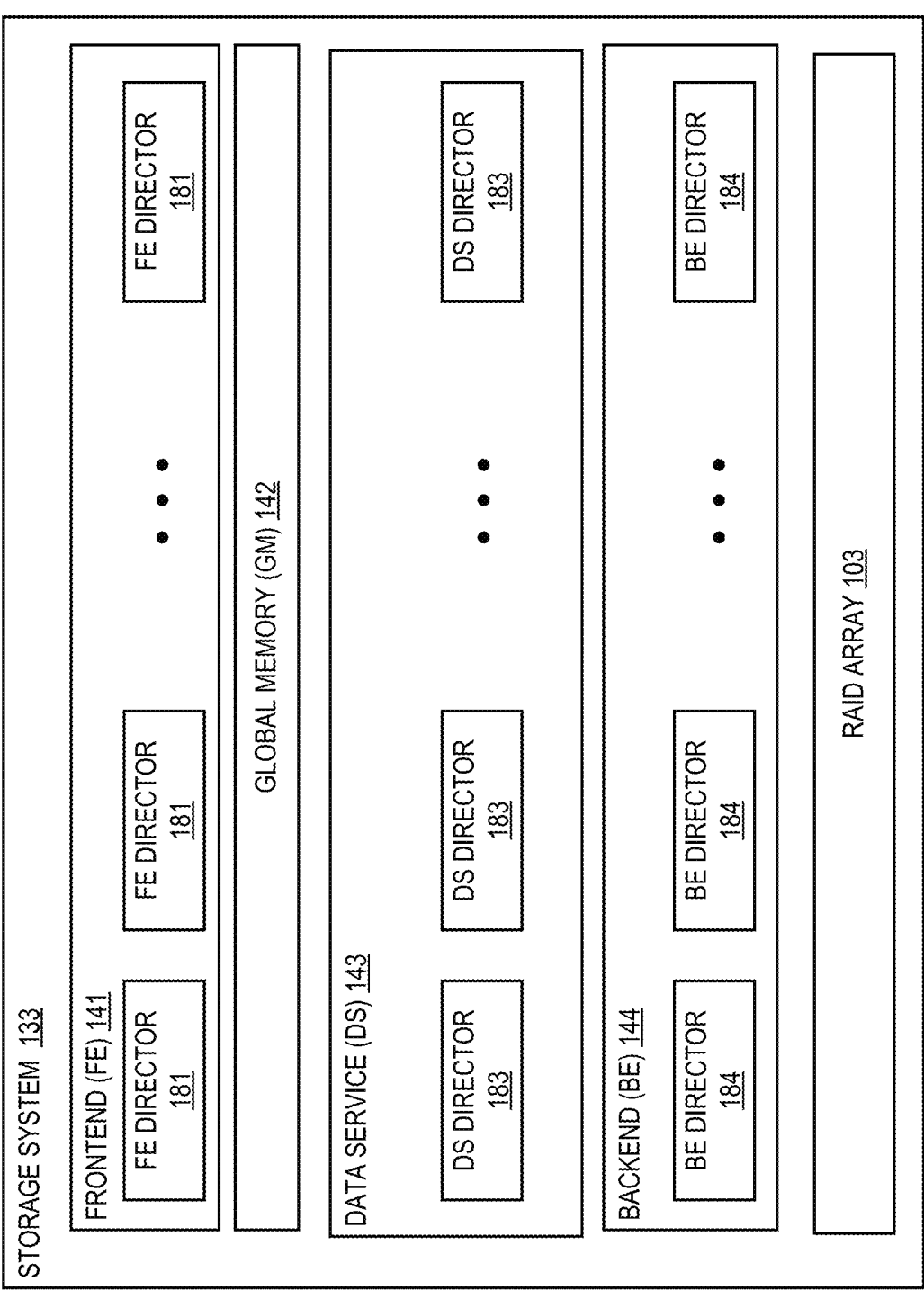
FIG. 1B is a diagram of an example of a storage system, according to aspects of the disclosure.

FIG. 1B is a diagram illustrating aspects of the operation of storage system 133, according to aspects of the disclosure. As illustrated, the storage system 133 may include a frontend (FE) 141, a global memory (GM) 142, a data service (DS) 143, and a backend (BE) 144. FE 141 may be comprised of one or more FE directors 181. Each FE director 181 may include one or more processes that are executed on a respective one of the storage processors 102. DS 143 may be comprised of one or more DS directors 183. Each DS director 183 may include one or more processes that are executed on a respective one of the storage processors 102. BE 144 may be comprised of one or more BE directors 184. Each BE director 184 may include one or more processes that are executed on a respective one of the storage processors 102. GM 142 includes a shared memory space that is used by storage system 133 for caching data. GM 142 may include a plurality of memory portions that are united in the same address space, wherein each of the plurality of memory portions is part of the volatile memory (e.g., DRAM) of a different respective one of the storage processors 102. Although, in the present example, GM 142 is used to cache data, it will be understood that alternative implementations are possible in which GM 142 is replaced with a different type of cache memory. In other words, the present disclosure is not limited to using any specific type of cache memory.

Figure 1C:
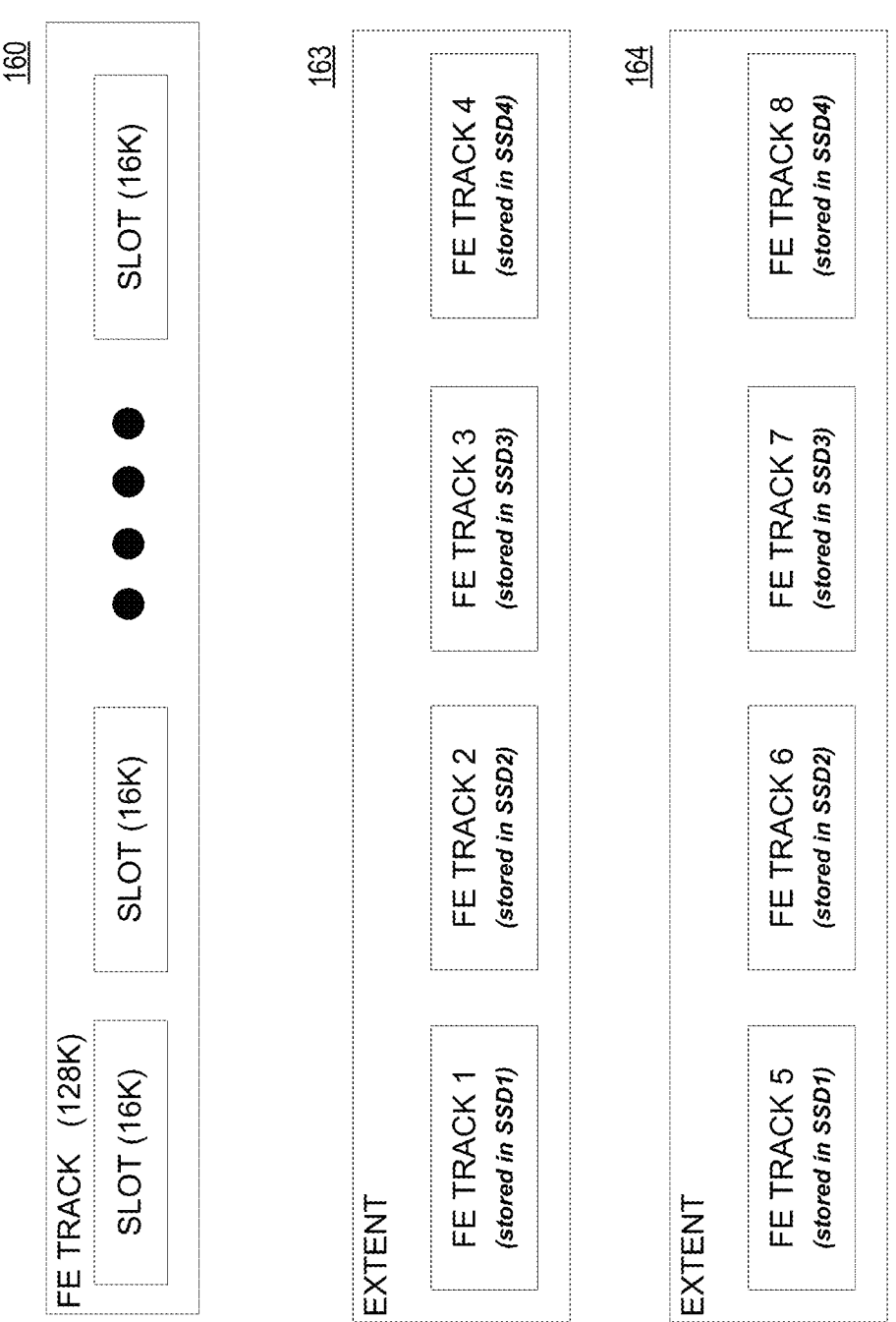
FIG. 1C is a diagram of an example of different units of data storage, according to aspects of the disclosure.

FIG. 1C shows an example of an FE track 160. The term "frontend track" as used throughout the disclosure refers to a data block, or a unit of data storage, in which data is cached into the GM 142. According to the present example, the FE track 160 is 128K in size and it consists of a plurality of slots that are each 16K in size. However, in an alternative implementation, the FE track 160 may have a mix of 64K and 16K slots. Stated succinctly, the present disclosure is not limited to any specific implementation of the FE track 160 and/or the slots that form the FE track. The term "slot" as used herein refers to a smaller unit of data storage that is part of an FE track. Further shown in FIG. 1C are extents 163 and 164. Extent 163 includes FE tracks 1-4 and extent 164 includes FE tracks 5-8. As used herein, the term "extent" refers to a set of sequential FE tracks (i.e., FE tracks having sequential addresses). According to the present example, any of FE tracks 1-8 is the same or similar to FE tack 160.

Figure 1D:
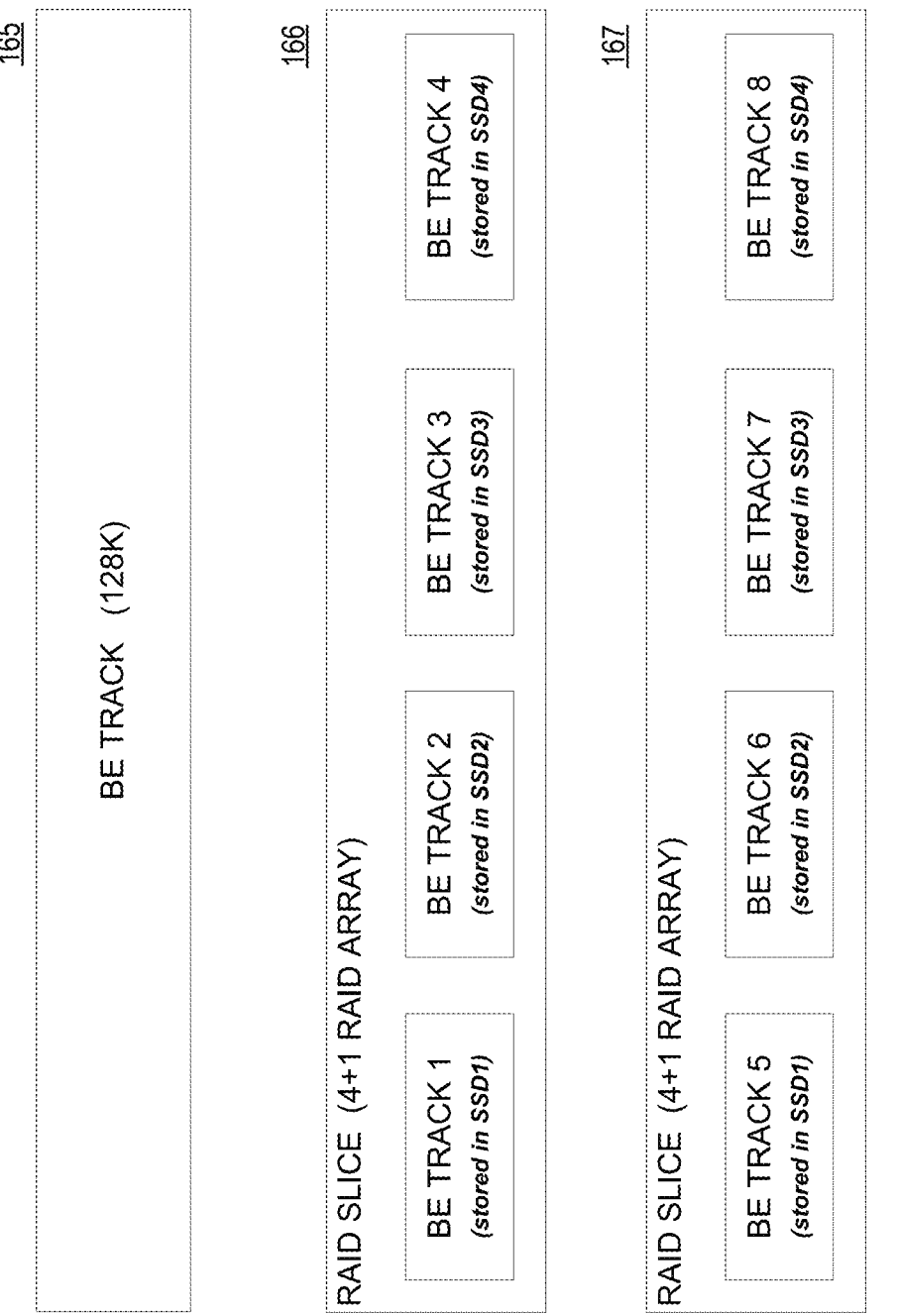
FIG. 1D is a diagram of an example of different units of data storage, according to aspects of the disclosure.

FIG. 1D shows an example of a BE track 165. The term "backend track" as used throughout the disclosure refers to a data block, or a unit of data storage, in which data is stored in the RAID array 103. According to the present example, the BE track 165 is 128K in size. However, the present disclosure is not limited to any specific implementation of the BE track 165. According to the present example, the BE track 165 is not divided into slots as is the case with the FE track 160, which is discussed above with respect to FIG. 1C. However, the present disclosure is not limited thereto, and in some implementations, the BE track 165 may be divided into slots. Stated succinctly, the present disclosure is not limited to any specific implementation of the BE track 165. The term "slot" as used herein refers to a smaller unit of data storage that is part of a BE track. Further shown in FIG. 1D are RAID slices 166 and 167. RAID slice 166 includes BE tracks 1-4 and RAID slice 167 includes BE tracks 5-8. As is well-known in the art, the term "RAID slice" refers to a logical segment or partition of storage within a RAID array. Although, the example of FIG. 1D assumes a 4+1 RAID array, it will be understood that the present disclosure is not limited to any specific type of RAID configuration. Furthermore, it will be understood that the present disclosure is not limited to any specific size of the FE tracks and the BE tracks that are used by storage system 133. The mapping between BE tracks and corresponding RAID slices may be established by a data structure that is stored in the memory of one or more storage processors 102 or elsewhere in storage system 133. The mapping may be static or it may change from time to time. The present disclosure is not limited to any specific method for implementing the mapping. Furthermore, according to the present example, each of the FE tracks is given a unique address that belongs to a frontend track address space maintained at FE 141 and each of the BE tracks is given a unique address that belongs to a backend track address space that is maintained at BE 144.

Figure 1E:
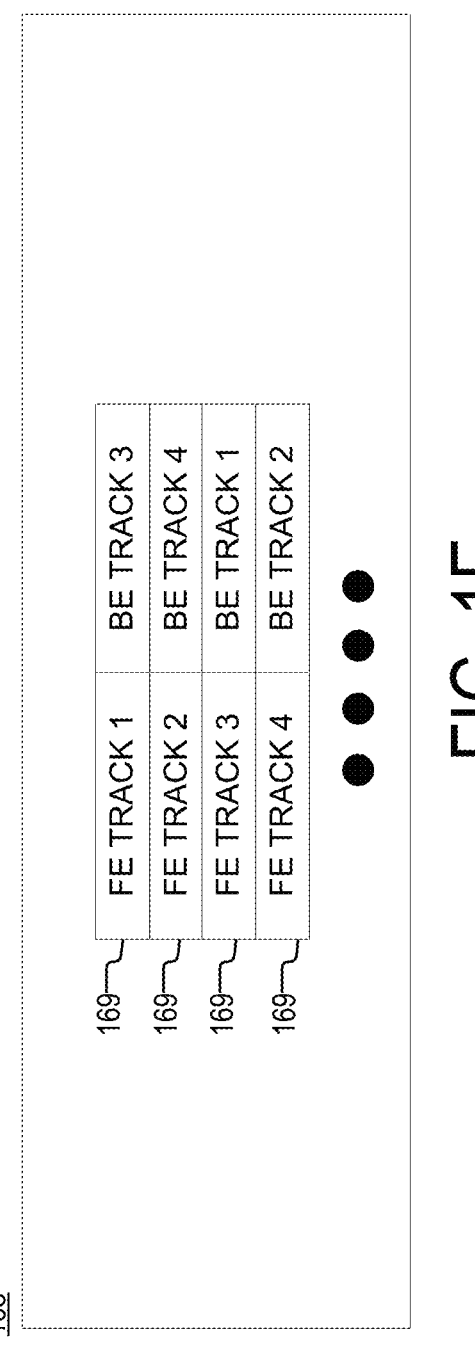
FIG. 1E is a diagram of an example of a data structure, according to aspects of the disclosure.

FIG. 1E is a diagram of an example of a data structure 168, according to aspects of the disclosure. According to the present example, data structure 168 includes a plurality of entries 169. Each entry 169 includes an identifier (e.g., an address) of a respective FE track in GM 142 and an identifier (e.g., an address) of a respective backend track. In other words, data structure 168 is a map that maps each of the plurality FE tracks in GM 142 to a different corresponding one of the backend tracks. The data structure 168 may be stored in the memory of one or more of storage processors 102 and/or elsewhere in the storage system 133. The present disclosure is not limited to any specific implementation of data structure 168. Data structure 168 may be implemented as a single file, a plurality of files, a single database object, a plurality of database objects, and/or in any other suitable manner. Further information about the architecture shown in FIGS. 1A-E can be found in U.S. patent application Ser. No. 18/820,867, entitled INTELLIGENT RELOCATION DESTAGE, which is hereby incorporated by reference herein in its entirety.

FIG. 1F is a flowchart of an example of a process 170, according to aspects of the disclosure. According to the present example, process 170 is executed by storage system 133. At step 171, storage system 133 receives a write request. At step 172, storage system 133 identifies an FE track for the write request. The FE track may include user data for the write request (received at step 171) and/or metadata for the write request (e.g., a hash digest of the user data, etc.), as well as for other write requests. At step 173, storage system 133 identifies a BE track for the write request. The BE track may include various mappings that are used in identifying the physical location in RAID array 103 where the user data is going to be destaged. At step 174, storage system 133 creates an SSLO (Service-level Symmetric Link Object) object for the write request. The SSLO object may include a pointer to the FE track for the write request, a pointer to the BE track for the write request, and/or any other information (or pointers to information) that is needed for executing the write request. In one particular example, the SSLO object may include a bit mask. Each bit in the bit mask may correspond to a different FE track in storage system 133. When any of the bits has a first value (e.g., '1'), this may be an indication that the bit's corresponding FE track is associated with (i.e., pointed to) by the SSLO object. When any of the bits has a second value (e.g., "0'), this is an indication that the bit's corresponding FE track is not associated (or pointed to) by the SSLO object. When the SSLO object is destaged, the bits in the mask may be translated to FE track mapping and/or BE track mapping. As used throughout the disclosure, the phrase "object points to a track (e.g., a BE track or an FE track)" shall mean that the object includes an identifier of the track and/or other information that references the track (directly or indirectly), which can be used to identify the track. At step 175, storage system 133 places the SSLO object in an aging queue. At step 176, storage system 133 waits until a predetermined aging period has passed. After the aging period has passed, at step 177, storage system 133 removes the SSLO object from the aging queue and stores the SSLO object in a write commit queue. At step 178, storage system 133 retrieves the SSLO object from the write commit queue and uses the SSLO object to complete the write request. Using the SSLO object to complete the write request may include using the SSLO object to identify or retrieve information associated with the write request, and using the information to store the user data associated with the write request into the RAID array 103. In some respects, all write requests associated with the SSLO object may be destaged to the RAID array 103 as part of the same operation (or sequence of operations).

FIG. 1A-F are provided to illustrate one example of different data structures that are used to store metadata for completing a write request. Specifically, FIGS. 1A-F illustrate that user data corresponding to write requests (i.e., the data that is requested to be written) is stored in FE tracks, while various mappings (or portion thereof) which describe a relationship between the FE track and the physical location where the user data is to be stored are stored in a BE track. FE and BE tracks are pre-allocated, and they are always available to receive information (provided that they are not currently assigned to a pending write request).

However, in order for an FE track and/or a BE track to be assigned to an incoming write request, metadata associated with the FE and BE tracks needs to be retrieved. In Dell PowerMax™, the FE track metadata is referred to by the acronym FE TID (Track IDentifier), and the BE track metadata is referred to by the acronym BE TID. For example, and without limitation, the FE TID for a particular FE track may include virtual provisioning information (VPI), such as a cache slot, sector signature, version number, and a BE track number that can be used to create SSLO objects. For example, the BE TID for a BE track may include information that is needed when SSLO objects are taken out of the write commit queue for a write destage to a disk, such as an initialization state and sector signatures.

Figure 2:
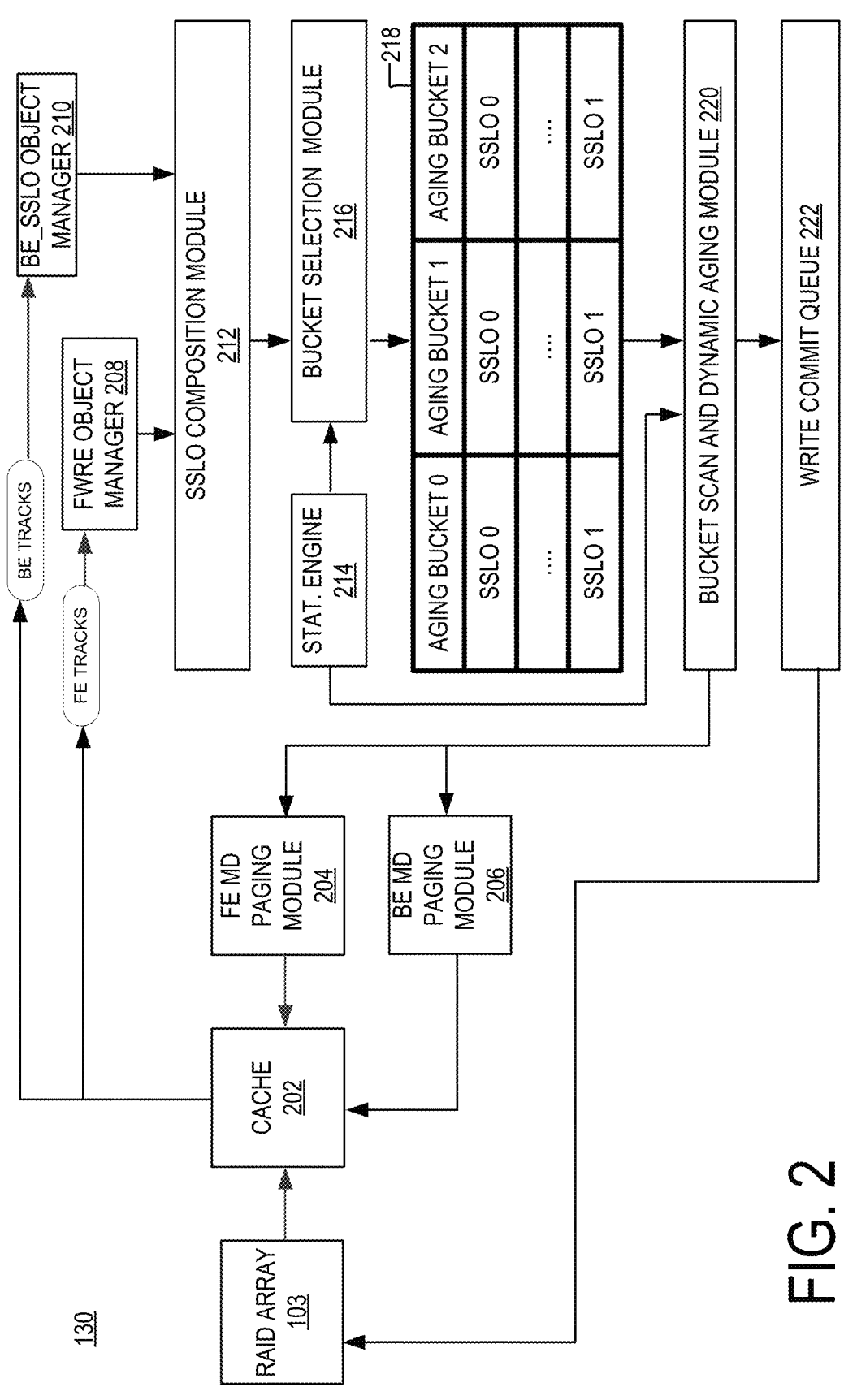
FIG. 2 is a diagram of an example of a configuration of the storage system of FIG. 1B, according to aspects of the disclosure.

In general, the FE TID for an FE track needs to be obtained before an FE track can be used to store user data and/or metadata for an incoming write request. The FE TID may be either cached (e.g., in cache 202 which is shown in FIG. 2) or it may be stored in a permanent storage (e.g., in RAID array 103 which is shown in FIGS. 1B and 2B). When a write request is being executed, a page of FE TIDs may be brought from the RAID array 103 and stored in GM 142 (or cache 202), provided that it is not already available in cache. Next any necessary FE TID metadata may be retrieved from the page. After the FE TID is retrieved, it may be used in storing user data and/or metadata in the FE track and/or to subsequently utilizing the FE track to complete the write request. And finally, any updates to the FE TID may be propagated by storing the page in the RAID array 103, eventually.

Similarly, the BE TID for a BE track needs to be obtained before an BE track can be used to store user data and/or metadata for an incoming write request. The BE TID may be either cached (e.g., in cache 202 which is shown or in FIG. 2) or it may be stored in a permanent storage (e.g., in RAID array 103 which is shown in FIGS. 1B and 2B). When a write request is being executed, a page of BE TIDs may be brought from the RAID array 103 and stored in GM 142 (or cache 202), provided that it is not already available in cache. Next any necessary BE TID metadata may be retrieved from the page. After the BE TID is retrieved, it may be used in storing data in the BE track and/or to subsequently utilizing the BE track to complete the write request. And finally, any updates to the BE TID may be propagated by storing the page in the RAID array 103, eventually.

It will be understood that FE TID is only one possible example of frontend metadata. However, it will be understood that the present disclosure is not limited to any specific type of frontend metadata being used. It will be understood that BE TID is only one possible example of backend metadata. However, it will be understood that the present disclosure is not limited to any specific type of backend metadata being used.

FIG. 1F is provided to illustrate the concept of aging. In very rough terms, the idea of aging involves waiting for a certain amount of time, after everything (or at least some of everything) is in place to complete the write request, before completing the write request. In the present example, a write request is aged after the FE track for the write request are completed and before the BE track for the write request is completed. In other words, the FE metadata for a write request needs to be fetched before a write request is aged (e.g., before an SSLO object corresponding to the write request is created and placed in tan aging queue, such as aging queue 218), while the BE metada for the same write request need to be fetched after the write request is aged (e.g., after the SSLO object corresponding to the write request is removed from the aging queue and placed in a write commit queue, such as the queue 222). Put differently, in order for an SSLO object be placed in an aging queue (e.g., in aging queue 218 shown in FIG. 2), only FE TID metadata is required while no BE TID metadata is required (it will be recalled that the TID may include an BE track identifier which is sufficient to initialize the SSLO object). In this regard, as is discussed further below aging time can be increased temporarily, during periods of high system load, to reduce paging activity that is associated with BE TID metadata, which in turn allows for an increase in paging activity associated with FE metadata. As can be readily paging activity associated with FE TID metadata involves bringing in FE TID metadata from permanent storage to cache and paging activity associated with BE TID metadata involves bringing in BE TID metadata from permanent storage to cache.

The utility of aging is in that it makes storage system 133 more efficient in situations in which the same logical block address (or same FE track) is written to multiple times in close succession. For example, when write requests are received in close succession, if no aging is used, the metadata and user data associated with the write requests would be written repeatedly to the RAID array 103. However, because accessing the RAID array 103 is slower than accessing the cache of storage system 133 (e.g., GM 142), the efficiency of the system will be decreased. By contrast, when aging is used, the updates to the logical block address can be handled by updating data in cache (e.g., GM 142), with only the final write request in the sequence being committed to the RAID array 103. In other words, because accessing cache is faster and accessing the RAID array 103, the use of aging improves the efficiency of the storage system 133 in situations in which the same LBA or same FE track experiences a burst of writes. In the example of FIG. 1F, the aging is performed by placing the SSLO object into an aging queue and waiting for a particular aging period before moving forward.

In other words, the execution of write requests involves paging FE and BE metadata into GM 142, and paging FE and BE metadata in and out of GM 142. The capacity of GM 142 may be limited. When GM 142 becomes full, the performance of storage system 133 may be significantly degraded. In this regard, the longer write requests are aged for, the greater the likelihood that GM 142 (or another cache) would become full. Stated succinctly, the use of aging can increase the efficiency of a storage system, but it also increases the likelihood that the cache of the storage system will become full. The discussion that follows presents an improved method and system for aging of write requests which balances these considerations.

FIG. 2 is a schematic diagram illustrating an example of a possible configuration of storage system 133 which implements the improved method and system for aging, according to aspects of the disclosure. Shown in FIG. 2 are the RAID array 103, a cache 202, a FE MD paging module 204, a BE MD paging module 206, an FE write request object (FWRO) manager 208, a BE_SSLO object manager 210, an SSLO composition module 212, a statistics engine 214, a bucket selection module 216, an aging queue 218, a bucket scan and dynamic aging module 220, and a write commit queue 222.

The aging queue 218 may include a plurality of buckets. Each bucket may be a data structure that is used to store service-level symmetric link objects (SSLOs), or another type of object, which is used to execute or otherwise track pending write requests. In one example, the aging queue 218 may be implemented as an array (or linked list) of objects (e.g., bucket), wherein each object is configured to encapsulate a data structure used to implement a given bucket and an indication of an aging time for the given bucket. In this example, the aging time of the given bucket is the time an SSLO object (or another type of object) must spend in the given bucket before being transferred to the write commit queue 222.

Module 220 may be configured to retrieve SSLO objects from the aging queue 218 and store the SSLO objects in the write commit queue. Module 220 may be configured to examine the buckets of aging queue 218 in a sequence. For each bucket, module 220 may recalculate the aging time of the bucket, determine the age of the SSLO objects in the bucket, and transfer, to the write commit queue 222, all SSLO objects in the bucket whose age is greater than the bucket's aging time. The age of an SSLO object is the time that the SSLO object has spent in the bucket. In some implementations, the buckets may be examined in a round-robin fashion, but the present disclosure is not limited thereto. Although, in this example, the aging time of each bucket is recalculated every time before the bucket is examined, the present disclosure is not limited thereto. In some implementations, the aging time of any of the buckets in aging queue 218 may be updated repeatedly over the course of its use in accordance with a different pattern. For example, the aging time of any of the buckets in aging queue 218 may be updated every 5 minutes. As another example, the aging time of any of the buckets in aging queue 218 may be updated every time the current load of storage system 133 (or portion thereof) crosses one of a plurality of thresholds. In some implementations, module 220 may execute a process 400, which is discussed further below with respect to FIG. 2. By way of example, and without limitation, updating the aging time of a bucket may include retrieving a bucket object that is used to implement the bucket and changing the value of variable inside the object which corresponds to the aging time of the bucket.

The write commit queue 222 is a data structure where SSLO objects are placed when they have aged out of the aging queue 222. In general, after the SSLO object is placed in the write commit queue, data associated with the SSLO object's corresponding write requests is stored in RAID array 103 (e.g., see step 178 of process 17).

Cache 202 may be a portion of GM 142 where pages of metadata (e.g., FE metadata (MD) and BE MD) are brought in from RAID array 103. Cache 202 may also store user data associated with write requests that are pending at storage system 133. Additionally or alternatively, cache 202 may store FE tracks and BE tracks that are initialized in storage system 133.

Module 204 may be configured to bring in pages of BE metadata from RAID array 103 into cache 202. Furthermore, module 204 may be configured to replace pages of FE metadata that are currently stored in the object store. The replacement may be performed in accordance with a least recently used (LRU) algorithm and/or any other similar algorithm.

Module 206 may be configured to bring in pages of BE metadata from RAID array 103 into Cache 202. Furthermore, module 206 may be configured to replace pages of BE metadata that are currently stored in the object store. The replacement may be performed in accordance with a least recently used (LRU) algorithm and/or any other similar algorithm.

Manager 208 may be configured to generate and manage frontend write request objects (FWRO). Each FWRO object may represent (or reference) a corresponding FE track. Manager 208 may further include a binary tree or another data structure where the FWRO objects are stored. In one example, each of the FWRO object may serve as a handle for one of the FE tracks in storage system 133.

Manager 210 may be configured to generate BE_SSLO objects. Each BE_SSLO object may represent (or otherwise reference) a different BE track. Manager 210 may further include a binary tree or another data structure where the BE_SSLO objects are stored. In one example, each of the BE_SSLO object may serve as a handle for one of the BE tracks in storage system 133.

Module 212 may be a module that is configured to combine FWRO and BE_SSLO objects into SSLO objects. Each SSLO object may include pointers to or otherwise reference one or more FWRO objects and one or more BE_SSLO objects. For each FWRO that is included in an SSLO object, the same SSLO object may include the BE_SSLO object that corresponds to the FWRO object. As discussed above a BE track corresponds to one or more FE tracks (e.g., see FIGS. 1D-E). Thus, a BE_SSLLO object corresponds to an FWRO object when the BE_SSLO object's BE track corresponds to the FWRO object's FE track. An FE track corresponds to a BE track when both the BE track and the FE track contain data (e.g., metadata and/or user data) associated with the same write request. The phrase "user data associated with a write request" refers to the data that is required to be written by the write request.

Engine 214 may be configured to obtain the values of various dynamic properties of runtime system resources of storage system 133 and provide the values to modules 216 and 220, where they are used to select the respective bucket that is to receive individual FWRO objects and adjust the aging time of the buckets in the aging queue 218. In one example, engine 214 may be configured to obtain the values of parameters 1-5, which are discussed further below, and provide the values to bucket selection module 216. Additionally or alternatively, in one example, engine 214 may be configured to obtain the values of parameters A-E, which are discussed further below, and provide the values to module 220.

Module 216 may be configured to receive SSLO objects that are generated by module 212 and store the SSLO objects in the aging queue 218. Specifically, for each received SSLO object, module 216 may use one or more of parameters 1-5 as a basis for selecting one of the buckets in aging queue 218, after which module 216 may store the SSLO object in the selected bucket. In some implementations, module 216 may be configured to execute a process 300, which is discussed further below with respect to FIG. 3.

A non-limiting example is now provided of parameters that can be collected or otherwise obtained by engine 214. Specifically, engine 214 may be configured to identify one or more of the following parameters:

Parameter 1—FWRO hot/cold level: This parameter identifies the likelihood that the FE track corresponding to a given FWRO object would be modified during the predetermined time window that starts at a current instant and ends in the future. An FE track may contain data associated with one or more write requests. Each of the write requests corresponds to a particular logical block address (LBA) where user data is being requested to be stored. The FWRO hot/cold level may be equal to otherwise based on the rate at which the LBAs would be modified during the time window and/or another event will happen that would necessitate a modification of the information stored in the FE track. The probabilities or rates of modification for individual LBAs may be determined by using a predictive machine learning (ML) model, that is similar to the model described in U.S. patent application Ser. No. 18/889,501, entitled Activity-Based Metadata Paging, which is herein incorporated by reference in its entirety. The present disclosure is not limited to any specific mode for load prediction. Alternatively, this parameter may be equal to or otherwise determined based on parameter 2. For example, parameter 1 may be determined by scaling parameter 2 based on the ratio of the current load of storage system 133 and the load experienced by storage system 133 during the period for which parameter 2 is calculated.

Parameter 2—FWRO update frequency: This parameter identifies the rate at which the FE track associated with a given FWRO object was modified (or updated) during a predetermined past period. As noted above, the FWRO object may be associated with pending write requests that attempt to store data at LBAs. In this regard, this parameter may be calculated based on the average of the frequency at which each individual one of the LBAs is modified and/or the frequency at which other events occur that require modification of the FE track.

Parameter 3—Number of FE tracks in the SSLO object: This parameter refers to the count of FE tracks (or FWRO objects) that are pointed to by the SSLO object.

Parameter 4:—SSLO MD miss rate: This parameter measures the number of cache misses associated with the SSLO object. As can be readily appreciated, when a write request is received, storage system 133 would attempt first to find in cache 202 the metadata corresponding to the write request (or page where the metadata would be stored). If the metadata and/or page is not available in cache 202, a cache miss will be generated. Furthermore, as noted above, a given SSLO may be associated with a plurality of write requests (which may correspond to the same or different FWRO objects/FE tracks that are referenced by the SSLO object). In this regard, this parameter may be equal to the percentage or number of the write requests associated with the SSLO object which have generated by a page miss. As can be readily appreciated, the complement of MD miss is MD hit rate. In this regard, MD hit rate may be used instead of MD miss provided that the necessary modifications are made. Those of ordinary skill in the art will readily recognize, after reading the present disclosure, what modifications would need to be made.

Parameter 5—SSLO IO pattern: This parameters indicates whether the write requests associated with an SSLO object are part of a sequential write pattern or a random pattern. For example, the write requests may be considered part of a sequential pattern if there exists a subset of the write requests, which has a predetermined size (e.g., 75% or 95%), whereby the LBA (or a physical address) of each write request in the subset is separated by no more than 2 (or another number) of places from the LBA (or a physical address) of at least another one of the write requests in the subset. In general, an SSLO object may be regarded as having a sequential write pattern if the write requests corresponding to the SSLO object write to the same region of a logical unit (or to the same region of RAID array 103). If an SLLO object does not have a sequential write pattern, the SSLO may be regarded as having a random pattern. This parameter may have one value when the write pattern of an SSLO object is random, and another value when the write pattern is sequential. The present disclosure is not limited to any specific criteria for detecting whether the write pattern of the write requests associated with an SSLO object is sequential or random.

Parameter A—Hit rate associated with incoming write requests: This parameter indicates the frequency at which a cache hit is generated when storage system 133 attempts to retrieve from cache 202 the metadata associated with a pending write request (or the page where the metadata would be stored). The complement of this parameter would be "miss rate associated incoming write requests. In this regard, the cache hit and cache miss rates may be determined interchangeably, provided that simple adjustments are made.

Parameter B—MD page-in time of storage system 133: This parameter indicates the time (e.g., average or mean time, etc.) that it takes for storage system 133 to load metadata (or a page) from RAID array 103 into cache 202.

Parameter C—System write-pending (WP) level: This parameter indicates the number write requests that have been received at storage system 133 which have not yet been destaged to permanent storage (or which have not been yet fully completed). Although in this example, parameter C is WP level, alternative implementations are possible in which the parameter C may be any other measure of the load on storage system 133 or portion thereof. The phrase "load on a portion of storage system 133" may refer to the rate at which write requests are received for a particular logical unit or group of logical units.

Parameter D—Bucket number: This parameter identifies the number of a bucket whose aging time is being updated and is used in calculating the updated aging time for the bucket. In some implementations, the respective bucket number that is assigned to each of the buckets in aging queue 218 may be used to reference the bucket. Furthermore, the bucket number may be used to indicate a relative priority of the bucket. The priority of the bucket corresponds to the aging time of the bucket. As is discussed further below, the aging time of a bucket may depend on a variety of factors, in addition to the number of the bucket. However, all else held equal, higher bucket priority will correspond to a lower aging time for the bucket, and a lower bucket priority will correspond to a higher aging time for the bucket. In other words, write requests that are put in a higher priority bucket (by means of their FE tracks) would incur a lower aging period and will be destaged faster.

Parameter E—MD balance: This parameter measures the ratio between the size of the portion of GM 142 (and/or cache 202) in which FE metadata is stored and the size of the portion of GM 142 (and/or cache 202) in which BE metadata is stored.

An example is now provided of a method for determining the respective aging time of each of the buckets in the aging queue 218. The method may be executed by module 220. Each of the buckets in aging queue 218 may be assigned a default aging time. For example, bucket 0 may be assigned a default aging time of 10 seconds, bucket 1 may be assigned a default aging time of 20 seconds, and bucket 2 may be assigned a default aging time of 30 seconds. These default aging times may be adjusted (e.g., increased or decreased) based on dynamic properties of the runtime system resources of storage system 133. For example, the value of one or more of parameters A-E may be determined and the aging time of any of the buckets in aging queue 218 may be determined in accordance with the equation of $$uat = \frac{1}{q} * \sum\nolimits_{n=1}^{q} (dat * k_n * p_n),$$

where uat is the updated aging time for any of the buckets in aging queue 218, dat is the default aging time of the same bucket, pn is the value of one of parameters A-F, and kn is a scaling constant that corresponds to parameter pn. The constant kn may be equal to 1 or another value.

An example is now provided of another method for determining the respective aging time of each of the buckets in aging queue 218. The method uses a machine learning (ML) model to determine the aging time of any of the buckets in aging queue 218. The ML model may be executed by module 220 and/or on one or more computing devices that are part of the storage system 133. The ML model may receive as input the identifier of a bucket and the values of one or more parameters A-E. The model may output the value of the aging time of the identified bucket. In one example, the machine learning model may include a neural network, such as a feed-forward neural network (FNN), a bidirectional encoder model (BERT) or a generative pre-trained transformer model (GPT). The present disclosure is not limited to using any specific type of ML model. The model may be trained by using any supervised or unsupervised training algorithm. The model may be trained based on a training dataset that includes a plurality of entries. Each entry may include a first portion and a second portion. The first portion may include the values of one or more parameters A-E. The second portion may be a label that identifies an appropriate aging time. The label may be used only when the model is trained by using a supervised training algorithm.

FIG. 2 is provided as an example only. Although, in the example of FIG. 2, aging queue 218 includes three buckets, alternative implementations are possible in which aging queue 218 incudes a larger number of buckets (or a smaller number of buckets—e.g. 1 bucket or 2 buckets). In this regard, it will be understood that the present disclosure is not limited to any specific implementation or size of aging queue 218. According to the example of FIG. 2, the bucket selection module 216 is implemented as part of BE 144. However, the present disclosure is not limited to any specific implementation of bucket selection module 216. For example, in some instances, bucket selection module 216 may be implemented as part of DS 143. According to the example of FIG. 2, module 220 is implemented as part of BE 144. However, the present disclosure is not limited to any specific implementation of module 220. For example, in some implementations, module 220 may be implemented as part of DS 143. According to the example of FIG. 2, module 204 is implemented as part of FE 141, however in alternative implementations, module 204 may be implemented as part of a different component of storage system 133. According to the example of FIG. 2 module 206 and managers 208-210 are implemented as part of DS 143, however in alternative implementations, any of module 206 and managers 208-210 may be implemented as part of a different component of storage system 133.

The term "queue" as used in the phrase "aging queue" is not intended to imply a specific configuration or organization on the aging queue 218 and/or the buckets of the aging queue 218. The present disclosure is not limited to using any specific data structure to implement the aging queue 218 and/or the individual buckets in the aging queue 218. For example, the aging queue 218 may be implemented as a tree structure, a linked list, or an array of tree structures. Similarly, each of the buckets in aging queue 218 may be implemented as any suitable type of data structure, such as a queue data structure, a tree data structure, and so forth. The term "queue" as used in the phrase "write commit queue" is not intended to imply a specific configuration of the write commit queue 222. Write commit queue may be implemented by using a queue data structure, a tree structure, and/or any suitable type of data structure. The phrase "placing an entity in a data structure" may refer to one or more of: (i) storing the entity in the data structure, (ii) storing a pointer to the entity in the data structure, and/or (iii) storing in the data structure any suitable type of information that can be used to retrieve the entity and/or information that is stored in the entity. The term "pointer to an entity" refers to any information that can be used directly or indirectly to retrieve the entity or information stored in the entity.

Although in the example of FIG. 2, identifiers of SSLO objects are placed (or stored) in the aging queue, the present disclosure is not limited to storing any specific information in aging queue 218 which can be used to identify FE tracks and/or BE tracks of write requests that are pending in the storage system 133. The phrase "placing an FE track in a bucket of an aging queue" may refer to placing an identifier of the FE track in the bucket, placing in the bucket an identifier of an FWRO object that points to the FE track, placing in the bucket an identifier of an SSLO object that points to the FWRO object, and/or placing in the track any suitable information that can be used to identify the FE track or retrieve information that is stored in the FE track. The phrase "placing a BE track in a bucket of an aging queue" may refer to placing an identifier of the BE track in the bucket, placing in the bucket an identifier of a BE_SSLO object that points to the BE track, and/or placing in the bucket any suitable information that can be used to identify the BE track or retrieve information that is stored in the BE track. The term "pointer" may refer to a direct or indirect pointer.

In the example of FIG. 2, one or more of parameters 1-5 are used to determine the bucket where an FE track, BE track, or SSLO object, etc. would be placed. However, the present disclosure is not limited to any specific information being used as a basis for selecting a bucket in aging queue 218, for as long as storage system 133 is provided with the facilities for dynamic (or repeated) bucket selection based on dynamic runtime resources of storage system 133.

In the example of FIG. 2, one or more of parameters A-F are used to determine the aging time of the buckets in aging queue 218. However, the present disclosure is not limited to any specific information being used as a basis for assigning the aging time of the buckets in aging queue 218, for as long as storage system 133 is provided with the facilities for dynamic (or repeated) recalculation of the aging times of the buckets in aging queue 218. The methods discussed above for assigning bucket aging time may result in an MD balance that results in an improved response time of storage system 133. Parameter E (i.e., MD balance) may or may not be used in determining the aging time of a bucket. In some implementations, Parameter E may not be used at all, while improved MD balance still remains a consequence of the dynamic updating of bucket aging times.

FIG. 3 is a flowchart of an example of a process 300 for placing an SSLO object in the aging queue 218, according to aspects of the disclosure. Process 300 may be executed by one or more computing devices that are part of storage system 133.

At step 302, an SSLO object is obtained.

At step 304, a different respective fwro score is calculated for each of the FWRO objects in the SSLO object. For example, the fwro score may be equal to (or otherwise based on) the product of the hot/cold level of the FWRO object and the update frequency of the FWRO object. However, the present disclosure is not limited to any specific method for calculating the fwro score. The fwro score may be any measure of the frequency at which the tracks in the FWRO object are expected to be updated in the future or have been updated in the past. In some implementations, the fwro score may be equal to or otherwise based on only one of the hot/cold level of the FWRO object (e.g., parameter 1 of the FWRO object or its corresponding FE track) or the update frequency of the FWRO object (e.g., parameter 2 of the FWRO object or its corresponding FE track).

At step 306, the sum is calculated of the respective fwro_scores of the FWRO objects in the SSLO object. As can be readily appreciated, when the SSLO object includes only one SSLO object, the sum may be equal to the fwro score of the SSLO object.

At step 308, a bucket score is identified for the SSLO object by multiplying the sum (calculated at step 306) by a scalar to obtain a bucket score for the SSLO object. The scalar may be calculated based on the values of one or more of parameters 3-5. The present disclosure is not limited to any specific method or formula for calculating the value of the scalar. In one example, the formula for calculating the scalar may be arranged such that the write pattern of the SSLO object being sequential exerts a positive contribution on the end value of bucket score, and the write pattern being random exerts a negative contribution on the end value of the bucket score. In another example, the formula for calculating the scalar may be arranged such that the WP level of storage system 133 being high (or above a threshold) exerts a positive contribution to the end value of the bucket score, and the WP level being low (or below the threshold) exerts a negative contribution on the bucket score. In this example, a lower bucket score corresponds to a higher priority and vice versa.

In one example, the value of the scalar may be calculated by using a machine learning model. The model may receive as input the values of one or more of parameters A-E and 1-5, and output an indication of the scalar. The model may output the value of the aging time of the identified bucket. In one example, the machine learning model may include a neural network, such as a feed-forward neural network (FNN), a bidirectional encoder model (BERT) or a generative pre-trained transformer model (GPT). The present disclosure is not limited to using any specific type of ML model. The model may be trained by using any supervised or unsupervised training algorithm. The model may be trained based on a training dataset that includes a plurality of entries. Each entry may include a first portion and a second portion. The first portion may include a different set of values for one or more of parameters 1-5 and A-E. The second portion may be a label that includes the value of the scalar. The label may be used only when the model is trained by using a supervised training algorithm.

At step 310, the number of one of the buckets in the aging queue 218 is identified by normalizing the bucket score to the number of buckets in the queue. For example, if there are three buckets in aging queue 218, and the bucket score falls in the first third of the range for the bucket score, the SSLO object (obtained at step 302) may be placed in bucket 0. If the bucket score falls in the second third of the range, the SSLO object may be placed in bucket 1. If the bucket score falls in the last third of the range, SSL object may be placed in bucket 0.

At step 312, the SSLO object is stored in the bucket of the aging queue 218 whose number is identified at step 310.

FIG. 4 is a flowchart of an example of a process 400 for removing SSLO objects from aging queue 218, according to aspects of the disclosure. Process 400 may be executed by one or more computing devices that are part of storage system 133.

At step 402, a bucket in the aging queue 218 is selected. In some implementations, the bucket may be selected by using a round-robin algorithm.

At step 404, an aging time for the bucket is calculated. The aging time may be calculated in the manner discussed above with respect to FIG. 2. The present disclosure is not limited to any specific method for calculating the aging time.

At step 406, a determination is made if the bucket (selected at step 402) includes one or more SSLO objects whose age is greater than the aging time calculated at step 404. The term "age of an SSLO object" as used herein refers to the time which the SSLO object has spent in the bucket. If the bucket contains objects whose age is greater than the bucket's aging time, process 400 proceeds to step 408. Otherwise, process 400 returns to step 402 where another bucket is selected.

At step 408, all SSLO objects (in the selected bucket) whose age exceeds the aging time of the bucket are removed from the aging queue 218 and stored in the write commit queue 222. As discussed above, following the placement of the aged SSLO objects in the write commit queue 222, the write requests corresponding to the SSLO objects are completed.

In some implementations, process 400 may be executed in conjunction with process 300. In this regard, process 400 describes an arrangement in which storage system 133 waits until the SLLO object (stored at step 310) has aged out of the bucket it has been placed in, after which storage system 133 proceeds to destage the SSLO object into the write commit queue. Waiting until the object has aged out may include repeatedly (after some delay) updating the aging time of the bucket and checking to see if the SSLO object has been stored in the bucket for longer than the updated aging time.

As noted above, the technique for aging, an example of which is described above with respect to FIGS. 2-4, is advantageous because it enables storage system 133 to use aging to control the ratio of FE TID and BE TID metadata usage, if system conditions allow. This is especially useful for disposing efficiently of front-end I/Os. As discussed above, the use of aging delays the time when BE TID metadata would need to be paged in from permanent storage to cache. In this regard, increasing the aging time of a bucket may temporarily give storage system 133 more time (or resources) to page in FE TID metadata to dispose faster of FE I/Os which might otherwise disproportionately slow down the operation of storage system 133.

Figure 5:
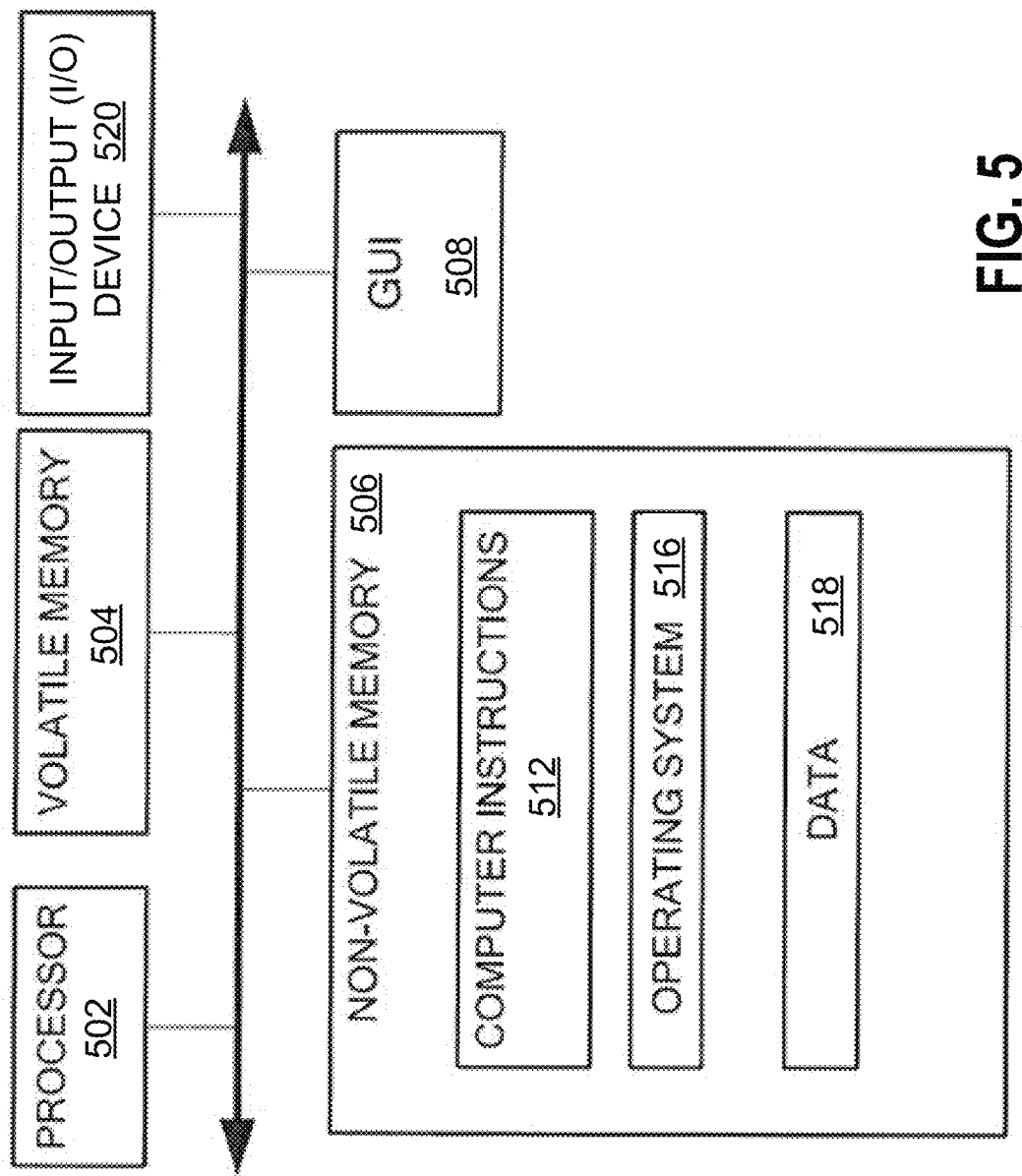
FIG. 5 is a diagram of an example of a computing device, according to aspects of the disclosure.

Referring to FIG. 5, in some embodiments, a device 500 may include processor 502, volatile memory 504 (e.g., RAM), non-volatile memory 506 (e.g., a hard disk drive, a solid-state drive such as a flash drive, a hybrid magnetic and solid-state drive, etc.), graphical user interface (GUI) 508 (e.g., a touchscreen, a display, and so forth) and input/output (I/O) device 520 (e.g., a mouse, a keyboard, etc.). Non-volatile memory 506 stores computer instructions 512, an operating system 516 and data 518 such that, for example, the computer instructions 512 are executed by the processor 502 out of volatile memory 504. Program code may be applied to data entered using an input device of GUI 508 or received from I/O device 520.

FIGS. 1A-5 are provided as an example only. In some embodiments, the term "I/O request" or simply "I/O" may be used to refer to an input or output request. At least some of the steps discussed with respect to FIGS. 1-5 may be performed in a different order or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. The acronym RAID, as used throughout the disclosure, means "Redundant Array of Independent Disks".

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus. In the example of FIGS. 1A-5, storage system 133 is a content-addressable storage system. However, the concept and ideas presented throughout the specification can be applied to location-addressable storage systems and/or any other suitable type of storage system.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system, comprising:
   selecting one or more front-end (FE) tracks that are arranged to cache data associated with one or more write requests;
   selecting a given one of a plurality of buckets in an aging queue as a recipient for the FE tracks, the given bucket being selected based on one or more characteristics of the FE tracks;
   placing the FE tracks in the given bucket;
   updating an aging time for the given bucket;
   waiting until an age of the FE tracks is greater than the aging time of the aging queue, and placing the one or more FE tracks in a write commit queue after the age of the FE tracks has become greater than the aging time of the aging queue; and
   completing the write requests after one or more FE tracks have been placed in the write commit queue.

2. The method of claim 1, wherein the aging time of the given bucket is updated repeatedly by the storage system.

3. The method of claim 1, wherein waiting until the age of the FE tracks is greater than the aging time of the aging queue includes examining each of the buckets in a round-robin fashion to remove, from the given bucket, any FE tracks whose age is greater than the aging time of the given bucket.

4. The method of claim 3, wherein a respective aging time of each of the plurality of buckets is recalculated every time before the given bucket is examined.

5. The method of claim 1, wherein placing the FE tracks in the given bucket includes generating an object that points to the FE tracks and a BE track corresponding to the FE tracks and placing the object in the given bucket.

6. The method of claim 1, wherein the aging time of the given bucket is updated based on one or more of an indication of priority of the given bucket, a hit or miss rate that is associated with a caching space of the storage system, a load of the storage system or portion thereof, and a page-in time of the storage system.

7. The method of claim 1, wherein each of the plurality of buckets has a different priority.

8. The method of claim 1, wherein the given bucket is selected based on at least one of a frequency at which the FE tracks are expected to be updated in a future period and/or the frequency at which the one or more FE tracks have been updated in a past period.

9. The method of claim 1, wherein the given bucket is selected based on a write pattern associated with the FE tracks.

10. The method of claim 1, wherein the given bucket is selected based on a hit and/or miss rate that is associated with the FE tracks.

11. A system, comprising:
   a memory; and
   at least one processor that is operatively coupled to the memory, the at least one processor being configured to perform the operations of:
      selecting one or more front-end (FE) tracks that are arranged to cache data associated with one or more write requests;
      selecting a given one of a plurality of buckets in an aging queue as a recipient for the FE tracks, the given bucket being selected based on one or more characteristics of the FE tracks;
      placing the FE tracks in the given bucket;
      updating an aging time for the given bucket;
      waiting until an age of the FE tracks is greater than the aging time of the aging queue, and placing the one or more FE tracks in a write commit queue after the age of the FE tracks has become greater than the aging time of the aging queue; and
      completing the write requests after one or more FE tracks have been placed in the write commit queue.

12. The system of claim 11, wherein the aging time of the given bucket is updated repeatedly by the storage system.

13. The system of claim 11, wherein waiting until the age of the FE tracks is greater than the aging time of the aging queue includes examining each of the buckets in a round-robin fashion to remove, from the given bucket, any FE tracks whose age is greater than the aging time of the given bucket.

14. The system of claim 13, wherein a respective aging time of each of the plurality of buckets is recalculated every time before the given bucket is examined.

15. The system of claim 11, wherein placing the FE tracks in the given bucket includes generating an object that points to the FE tracks and a BE track corresponding to the FE tracks and placing the object in the given bucket.

16. The system of claim 11, wherein the aging time of the given bucket is updated based on one or more of an indication of priority of the given bucket, a hit or miss rate that is associated with a caching space of the storage system, a load of the storage system or portion thereof, and a page-in time of the storage system.

17. The system of claim 11, wherein each of the plurality of buckets has a different priority.

18. The system of claim 11, wherein the given bucket is selected based on at least one of a frequency at which the FE tracks are expected to be updated in a future period and/or the frequency at which the one or more FE tracks have been updated in a past period.

19. The system of claim 11, wherein the given bucket is selected based on a write pattern associated with the FE tracks.

20. A non-transitory computer readable medium storing one or more processor-executable instructions, which, when executed by at least one processor, cause the at least one processor to perform the operations of:
   selecting one or more front-end (FE) tracks that are arranged to cache data associated with one or more write requests;
   selecting a given one of a plurality of buckets in an aging queue as a recipient for the FE tracks, the given bucket being selected based on one or more characteristics of the FE tracks;
   placing the FE tracks in the given bucket;

updating an aging time for the given bucket;

waiting until an age of the FE tracks is greater than the aging time of the aging queue, and placing the one or more FE tracks in a write commit queue after the age of the FE tracks has become greater than the aging time of the aging queue; and completing the write requests after one or more FE tracks have been placed in the write commit queue.

\* \* \* \* \*